US008965391B1

(12) United States Patent
Marupaduga et al.

(10) Patent No.: US 8,965,391 B1
(45) Date of Patent: Feb. 24, 2015

(54) METHODS, SYSTEMS, AND COMPUTER READABLE MEDIA FOR DYNAMIC TOGGLING OF SYNCHRONIZATION SIGNALING TO PROVIDE ACCESS CONTROL AND FREE UP RESOURCES

(71) Applicant: Sprint Spectrum L.P., Overland Park, KS (US)

(72) Inventors: Sreekar Marupaduga, Overland Park, KS (US); Nicholas D. C. Kullman, Kansas City, MO (US); Andrew M. Wurtenberger, Olathe, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 65 days.

(21) Appl. No.: 13/849,337

(22) Filed: Mar. 22, 2013

(51) Int. Cl.
*H04W 72/00* (2009.01)
*H04W 88/06* (2009.01)

(52) U.S. Cl.
CPC .................................... *H04W 88/06* (2013.01)
USPC .......... 455/452.2; 370/235; 370/329; 455/418

(58) Field of Classification Search
USPC .......... 370/235, 255, 329–330, 342; 455/433, 455/452.2
See application file for complete search history.

(56) References Cited

U.S. PATENT DOCUMENTS

| | | | | |
|---|---|---|---|---|
| 6,374,112 | B1 * | 4/2002 | Widegren et al. .......... | 455/452.2 |
| 6,487,183 | B1 * | 11/2002 | Lo et al. ........................ | 370/326 |
| 2008/0089281 | A1 * | 4/2008 | Yoon et al. ................... | 370/329 |
| 2009/0034432 | A1 * | 2/2009 | Bonta et al. .................. | 370/255 |
| 2010/0034087 | A1 * | 2/2010 | De Benedittis et al. ...... | 370/235 |
| 2010/0034150 | A1 * | 2/2010 | Wang et al. ................... | 370/329 |
| 2011/0007730 | A1 * | 1/2011 | Han et al. ...................... | 370/342 |
| 2011/0044159 | A1 * | 2/2011 | Kishiyama et al. .......... | 370/208 |
| 2012/0294611 | A1 * | 11/2012 | Adler et al. .................... | 398/45 |
| 2013/0201923 | A1 * | 8/2013 | Ren ................................ | 370/329 |
| 2013/0308595 | A1 * | 11/2013 | Ratasuk et al. ............... | 370/330 |

OTHER PUBLICATIONS

Gunawan, Arief Hamdani, Telkom Indonesia, LTE, Feb. 14, 2010, 97 pages.
LTE System Information: Part 1—Hongyan—Expert Opinion—LTE University, Aug. 9, 2010, 2 pages.
radisys.com, ePDG (Evolved Packet Data Gateway) Solutions, downloaded from the world wide web at http:www.radisys.com/solutions/wireless-security/ on Mar. 15, 2013, 6 pages.

(Continued)

*Primary Examiner* — Nathan Taylor

(57) ABSTRACT

System and methods for switching operating modes of a radio access node to increase data throughput for a user-equipment device are described. The radio access node can detect operating conditions to trigger switching from one operating mode to another. In a first operating mode, the radio access node can transmit non-bearer data, such as synchronization signals, to a UE device using a particular forward-link air interface resources. In response to detecting the defined condition(s), the radio access node can switch to a second operating mode in which the radio access node begins transmitting bearer data using the particular forward-link air interface resources used to transmit the non-bearer data while operating in the first operating mode. Upon detecting other operating condition(s), the radio access node can switch back to operating in the first operating mode. The radio access node can be configured as an eNodeB.

20 Claims, 7 Drawing Sheets

(56) References Cited

OTHER PUBLICATIONS

LTE Network Infrastructure and Elements, downloaded from the world wide web at https://sites.google.com/site/lteencyclopedia/lte-network-infrastructure-and-elements?tmpl= on Mar. 4, 2013, 3 pages.

Basir, Adnan—3GPP Long Term Evolution (LTE), Jun. 7, 2012, 3 pages.

Ghosh, Arunabha et al.; Fundamentals of LTE, table of contents, pp. 7-9, 20-35, 227-232, 246-248, and 289-290 (40 pages), Aug. 2010.

* cited by examiner

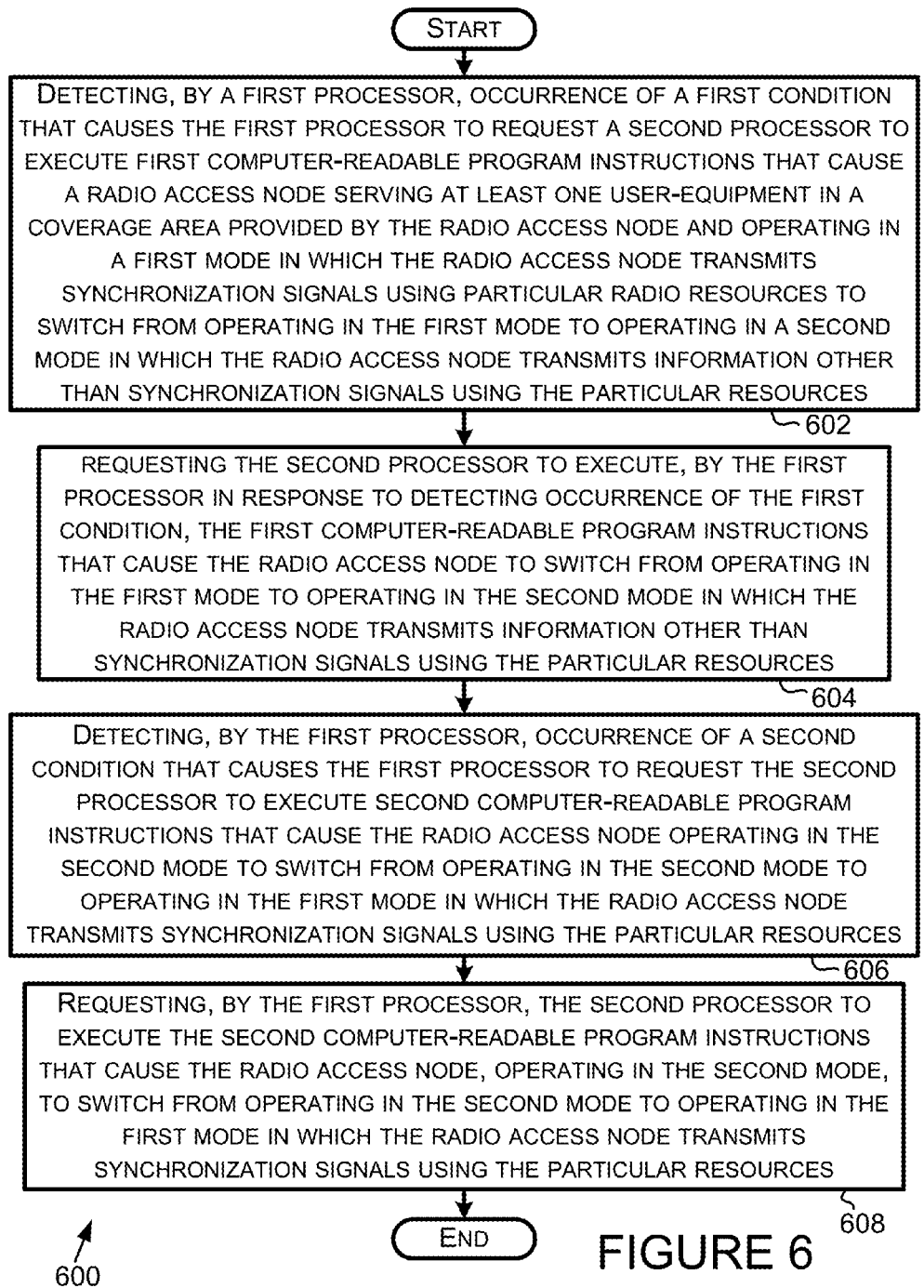

2013 Mar 18 16:03:21.513 [00]  0xB0C1 LTE RRCE
MIB Message Log Packet
Version = 1
Physical Cell ID = 69
FREQ – 8865
SFN = 692
Number of TX Antennas = 2
DL Bandwidith = 5 MHz (25)                                /702
Resource Element Allocation Change = Yes
Resource Element Allocation Change for other data related task
(Position No.)=0-2 & 3 – 40
                                              ↘
BCCH-BCH Message                              704
    Master Information Block
        MasterInformationBlock[0]BCCH-BCH-Message =
            message =
                dl-Bandwidth = n25
                Phich-Config -
                    phich-Duration = normal
                    phrich-Resource = one
                systemFrameNumber = 01110110
                spare = 000000000
    49D800                        ↖
                                  706

METHODS, SYSTEMS, AND COMPUTER READABLE MEDIA FOR DYNAMIC TOGGLING OF SYNCHRONIZATION SIGNALING TO PROVIDE ACCESS CONTROL AND FREE UP RESOURCES

BACKGROUND

Unless otherwise indicated herein, the elements described in this section are not prior art to the claims and are not admitted to be prior art by inclusion in this section.

User equipment (UE) devices, such as cell phones, are operable to communicate with radio access networks, such as cellular wireless networks. These UE devices and access networks typically communicate with each other over a radio frequency (RF) air interface according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols can be used as well, such as Code Division Multiple Access (CDMA), Global System for Mobile Communications (GSM), Time Division Multiple Access (TDMA), or some other wireless protocol.

The radio access networks can be configured to transmit a fixed amount of overhead messaging, such as overhead messaging to establish operating parameters of the radio access network. The overhead messaging may not be needed by all UE devices operating in the radio access network. Using radio resources to transmit the unneeded overhead messaging can reduce the amount of resources available for transmitting bearer data to the UE devices. Transmitting unnecessary messaging can degrade bearer data throughput to UE devices communicating with the radio access networks.

OVERVIEW

This application describes several example embodiments, at least some of which pertain to detecting a condition that a radio access node can use as a trigger to responsively switch operating modes so that the radio access node begins transmitting bearer data using resources that were used to transmit overhead messaging prior to detection of the condition.

In one respect, an example embodiment can take the form of a method comprising (i) detecting, by a first processor, occurrence of a first condition that causes the first processor to execute or to request a second processor to execute first computer-readable program instructions that cause a radio access node that is serving user-equipment in a coverage area provided by the radio access node and that is operating in a first mode in which the radio access node transmits synchronization signals using particular radio resources to switch from operating in the first mode to operating in a second mode in which the radio access node transmits information other than synchronization signals using the particular resources, and (ii) executing or requesting the second processor to execute, by the first processor in response to detecting occurrence of the first condition, the first computer-readable program instructions that cause the radio access node to switch from operating in the first mode to operating in the second mode in which the radio access node transmits information other than synchronization signals using the particular resources.

In another respect, an example embodiment can take the form of a system comprising (i) processor, (ii) a data storage device comprising computer-readable program instructions executable by the processor, and (iii) a radio transmitter configured to operate in a first mode in which the radio transmitter transmits, using particular radio resources, synchronization signals to user-equipment in a coverage area provided by the radio transmitter, wherein the computer-readable program instructions comprise first program instructions executable by the processor to cause the radio transmitter to switch from operating in the first mode to operating in a second mode in which the radio transmitter transmits, using the particular resources, information other than synchronization signals, and wherein the computer-readable program instructions comprise second program instructions executable by the processor to detect occurrence of a first condition that causes the processor to execute the first program instructions.

In yet another respect, an example embodiment can take the form of a non-transitory computer-readable data storage device comprising program instructions executable by a processor to cause performance of the following operations: (i) detecting occurrence of a first condition that causes the processor to execute first computer-readable program instructions that cause a radio access node that is serving user-equipment in a coverage area provided by the radio access node and that is operating in a first mode in which the radio access node transmits synchronization signals using particular radio resources to switch from operating in the first mode to operating in a second mode in which the radio access node transmits information other than synchronization signals using the particular resources, and (ii) executing, by the processor in response to detecting occurrence of the first condition, the first computer-readable program instructions that cause the radio access node to switch from operating in the first mode to operating in the second mode in which the radio access node transmits information other than synchronization signals using the particular resources.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which:

FIG. 6 is a flowchart depicting a set of functions that can be carried out in accordance with one or more example embodiments described herein; and FIG. 7 depicts example parameters for including within a Master Information Block (MIB).

DETAILED DESCRIPTION

I. Introduction

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of $1^{st}$, $2^{nd}$, $3^{rd}$, and so on.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions or operations) can be used instead. Furthermore, various functions or operations described as being performed by one or more elements can be carried out by a processor executing computer-readable program instructions or by any combination of hardware, firmware, or software.

II. Example System Architecture

Figure 1:
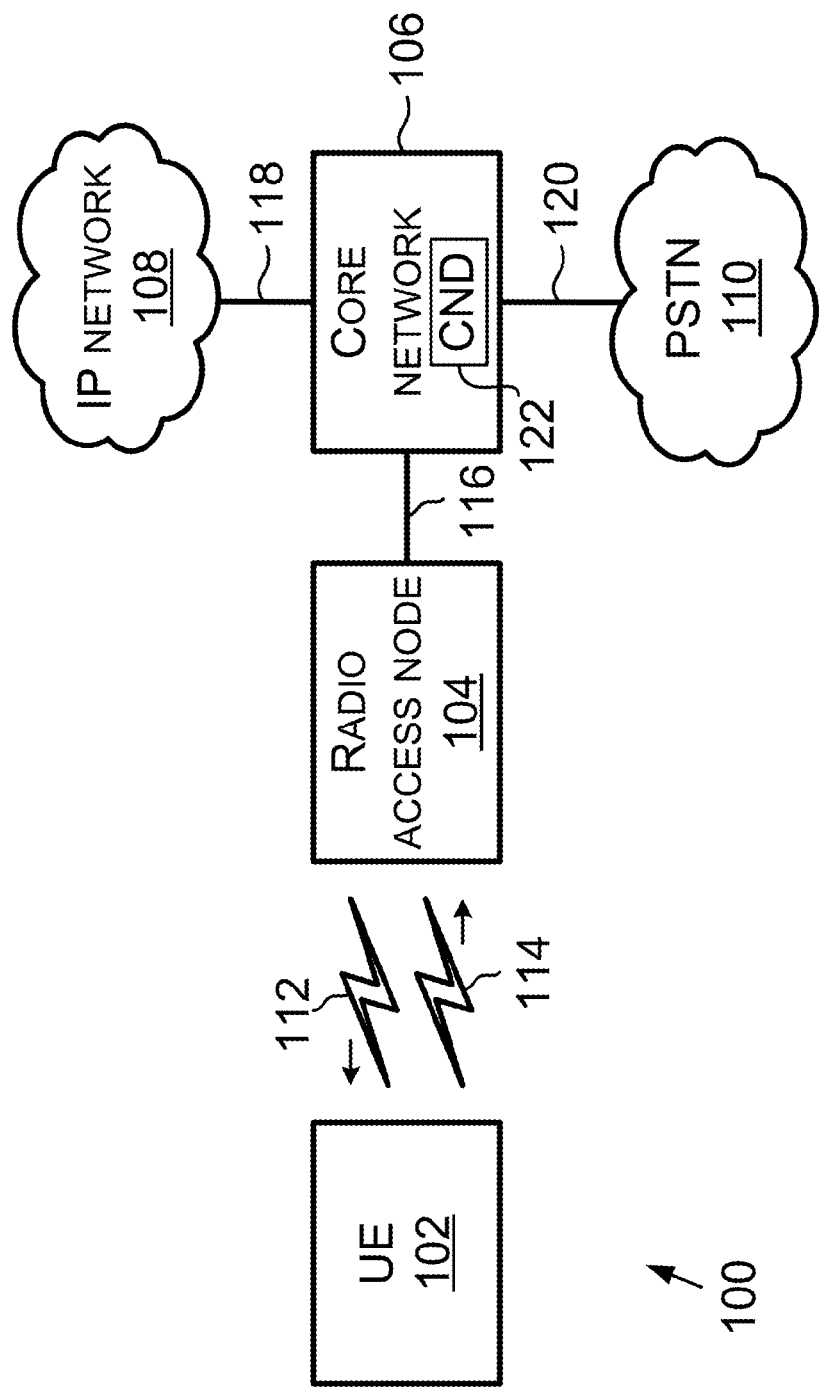
FIG. 1 is a block diagram of an example system in accordance with one or more example embodiments described herein.

FIG. 1 is a block diagram of a system 100 in accordance with one or more example embodiments. System 100 includes a user equipment device (UE) 102, a radio access node (RAN) 104, a core network 106, an Internet Protocol (IP) network 108, a public switched telephone network (PSTN) 110, a forward-link air interface 112, a reverse-link air interface 114, a backhaul network link 116, an IP-core-networks link 118, and a PSTN-core-network link 120. One or more other UE devices, configured like UE 102 or otherwise, can operate within system 100 to carry out wireless communications using RAN 104, or another RAN (not shown) that is configured for operation within system 100. The other RAN, like RAN 104, can be communicatively coupled to core network 106.

Core network 106 includes core network device (CND) 122 and can include one or more core network devices (not shown). IP network 108 can comprise at least a portion of the Internet. PSTN 110 can include at least a portion of the telephone network including land line telephones. IP network 108 and PSTN 110 can function as a respective transport network for CND 122 of core network 106.

UE 102 comprises a device that is configured to transmit radio frequency (RF) signals using reverse-link air interface 114 and to receive RF signals using forward-link air interface 112. UE 102 can, for example, comprise a mobile device, such as (i) a mobile telephone or smartphone, such as a Galaxy S III smartphone manufactured by Samsung Electronics Co., Ltd. of Suwon, Korea, or (ii) a tablet computing device, such as an iPad with retina display manufactured by Apple Inc. of Cupertino, Calif. The device configured to transmit and receive RF signals can comprise a transceiver. The transceiver can, for example, be arranged as a single-input-single-output (SIMO) transceiver, a multiple-input-multiple-output (MIMO) transceiver, or some other transceiver.

UE 102 can operate according to one or more wireless communications standards or protocols. For example, UE 102 can operate according to the $3^{rd}$ Generation Partnership Project (3GPP) standard, release 8, which is sometimes referred to as the long term evolution (LTE) standard. UE 102 operating according to the LTE standard can, for example, be configured to use orthogonal frequency division multiple access (OFDMA) on forward-link air interface 112, and single-carrier frequency division multiple access (SC-FDMA) on reverse-link air interface 114. Using OFDMA can be referred to as orthogonal frequency division multiplexing (OFDM). As another example, UE can operate according the 3GPP standard, release 7 & 8, which is sometimes referred to as high speed packet access evolved (HSPA+). UE 102 operating according to the HSPA+ standard can, for example, be configured to use code division multiple access (CDMA) or time division multiple access (TDMA) on both forward-link air interface 112 and reverse-link air interface 114. Other examples of communication standards or protocols UE 102 can use are also possible.

UE 102 can also be configured to communicate with devices on IP network 108 or PSTN 110 using wired communication links without RAN 104. In that configuration, UE 102 can, for example, comprise a laptop computing device with an Ethernet card that connects to IP network 108 or PSTN 110 using the Ethernet card and a local area network. That example UE can include components for interfacing with RAN 104, such as a data card and Wi-Fi hotspot, such as a Merlin CC208 3G/$G 2-in-1 Card manufactured by Novatel Wireless, Inc. of San Diego, Calif.

RAN 104 comprises a node that is configured to transmit RF signals using forward-link air interface 112 and to receive RF signals using reverse-link air interface 114. RAN 104 is configured to communicate with core network 106 backhaul network link 116. RAN 104 can be configured to communicate with UE using one or more communication standards.

In accordance with an embodiment in which RAN 104 is configured to carry out communications in accordance with the 3G LTE release 8 standard, RAN 104 can comprise or be configured as an enhanced Node-B, or more simply an eNodeB, that is configured to interface to a system architecture evolution gateway (SAE-GW) and a mobility management entity (MME) of core network 106. In accordance with that same embodiment, core network device 122 can be configured as the eNodeB. The eNodeB can be configured to perform functionality of both a base station and radio network controller of prior wireless communication systems.

In accordance with an embodiment in which RAN 104 is configured to carry out communications in accordance with the 3G LTE release 7, RAN 104 can comprise or be configured as a Node-B that includes radio network controller functionality and is configured to interface to a system architecture evolution gateway (SAE-GW) of core network 106. In accordance with that same embodiment, core network device 122 can be configured as the SAE-GW.

In accordance with an embodiment in which RAN 104 is configured to carry out communications in accordance with the 3G/HSPA release 7, RAN 104 can comprise or be configured as a Node-B without radio network controller functionality and is configured to interface to a radio network controller, which interfaces to a gateway GPRS service node (GGSN) of core network 106. Other examples of RAN 104 are also possible. In accordance with that same embodiment, core network device 122 can be configured as the radio network controller, and another core network device 122 can be configured as the GGSN. Other example arrangements of RAN 104 are also possible.

Core network 106 is configured to carry out communications for users of UE devices, such as UE 102. A core network device 122 can be configured as a home subscriber server to authenticate UE 102 is authorized for using other elements of system 100. A core network device 122 can be configured as a gateway to permit UE 102 or another core network device to access and interface to another network or another portion of core network 102. The gateway, for example, can comprise a packet data network (PDN) gateway, and SAE-GW, an MME, or a GGSN. Other examples of functions core network 106 performs and other examples core network devices are also possible.

Backhaul network 116, IP-core-networks link 118, and PSTN-core-network links 120 can be configured in any of a variety of configurations for carrying bearer data and signal data between various elements connected to those network links. The bearer data comprises user data, such as voice data or World Wide Web browsing data. The signal data comprises control signals, such as signals identifying a telephone number being called. Backhaul network 116, IP-core-networks link 118, and PSTN-core-network links 120 can comprise wired or wireless links. Backhaul network 116, IP-core-networks link 118, and PSTN-core-network links 120 can comprise circuit-switched or packet-switched links.

Figure 2:
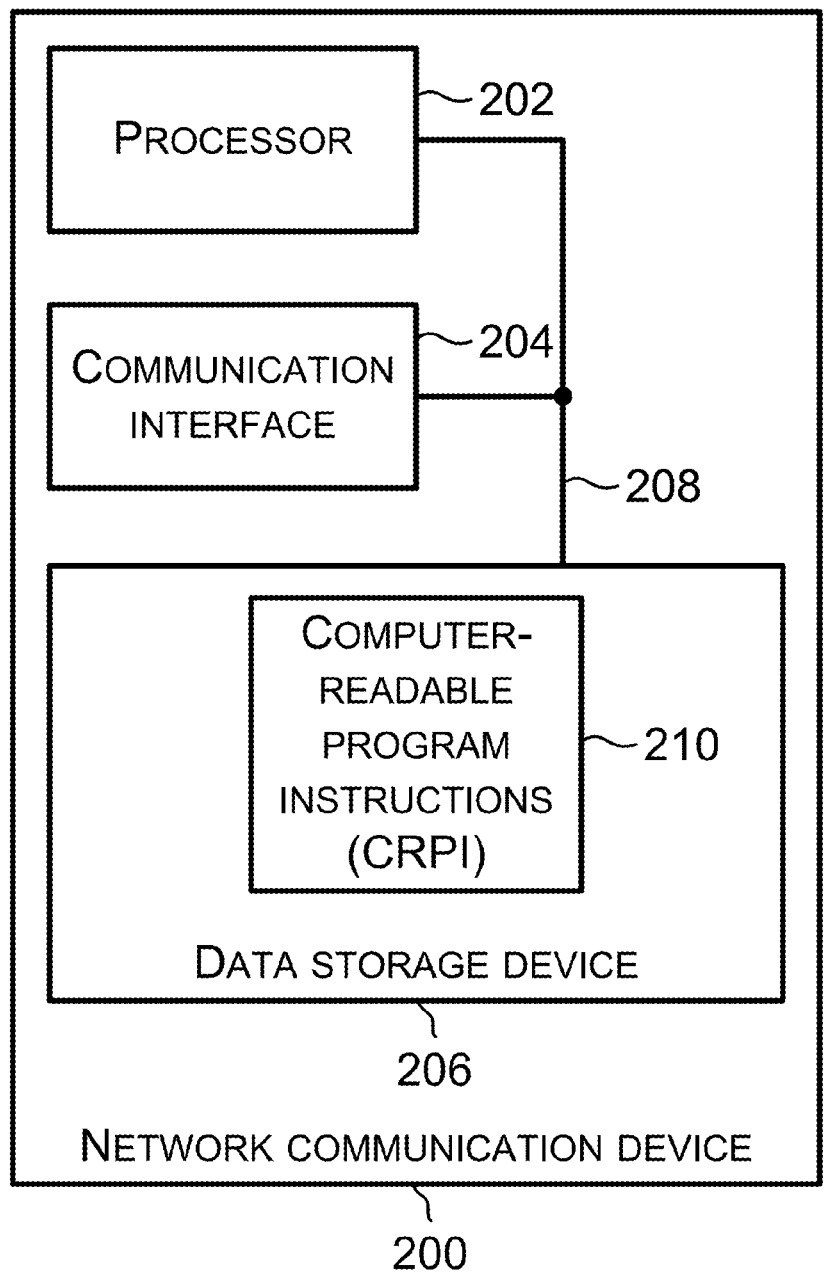
FIG. 2 is a block diagram of an example network communication device in accordance with one or more example embodiments described herein.

Next, FIG. 2 is a block diagram of an example network communication device 200 in accordance with one or more of the example embodiments. Network communication device 200 comprises a processor 202, a communication interface 204, and a data storage device 206, all of which can be linked together via a system bus, network, or other connection mechanism 208. One or more devices within system 100 can be configured like network communication device 200. For example, RAN 104 or core network device 122 can be configured like network communication device 200. Examples of differences between RAN 104 or core network device 122 being configured like network communication device 200 are described below.

Processor 202 can comprise one or more general purpose processors (for example, INTEL single core microprocessors or INTEL multicore microprocessors) or one or more special purpose processors (for example, application specific integrated circuits (ASICs) or digital signal processors (DSPs)). Processor 202 can execute computer-readable program instructions, such as computer-readable program instructions (CRPI) 210 stored in data storage device 206. Since RAN 104 can be configured like network communication device 200, RAN 104 can comprise processor 202. Similarly, since core network device 122 can be configured like network communication device 200, core network device 122 can comprise processor 202.

Communication interface 204 can comprise an interface (for example, one or more interfaces) to at least one other element of system 100. Communication interface 204 can comprise a transmitter configured to transmit and a receiver configured to receive communications such as signaling and bearer communications to or from another element of system 100. The transmitter and receiver can be separate or a combined transmitter and receiver in the form of a transceiver. Since RAN 104 can be configured like network communication device 200, RAN 104 can comprise communication interface 204. Similarly, since core network device 122 can be configured like network communication device 200, core network device 122 can comprise communication interface 204. A transmitter and receiver of communication interface 204 that transmits RF signals can be referred to as a radio transmitter and radio receiver, respectively.

Data storage device 206 can comprise a non-transitory computer-readable storage medium readable by processor 202. The computer-readable storage medium can comprise volatile and/or non-volatile storage components, such as optical, magnetic, organic or other memory or disc storage, which can be integrated in whole or in part with processor 202. At least a portion of data storage device 206 can be a non-transitory machine readable medium separate from processor 202. Since RAN 104 can be configured like network communication device 200, RAN 104 can comprise data storage device 206. Similarly, since core network device 122 can be configured like network communication device 200, core network device 122 can comprise data storage device 206.

CRPI 210 can comprise a variety of program instructions executable by processor 202. This description discusses execution of program instructions of CRPI 210. A person having ordinary skill in the art will understand that execution of program instructions of CRPI 210 can include executing some, but not all, of the program instructions of CRPI 210.

A person having ordinary skill in the art will also understand that program instructions of CRPI 210 can be stored within two or more separate portions of data storage device 206, such as a portion of data storage within RAN 104 and a portion of data storage within CND 122. A processor at RAN 104 can execute the program instructions stored at RAN 104 and a processor at CND 122 can execute the program instructions stored at CND 122. Execution of the program instructions stored within a data storage device at RAN 104 can cause occurrence of functions that trigger execution of the program instructions stored within a data storage device at CND 122. Similarly, execution of the program instructions stored within a data storage device at CND 122 can cause occurrence of functions that trigger execution of the program instructions stored within a data storage device at RAN 104.

CRPI 210 can comprise program instructions that cause RAN 104 to switch from operating in a mode in which RAN 104 transmits synchronization signals using particular radio resources to operating in another mode in which RAN 104 transmits information other than synchronization signals using the particular resources. In this description, these program instructions are referred to as first switching program instructions.

CRPI 210 can comprise program instructions that cause processor 202 to detect occurrence of (for example, detect existence of) a condition that causes processor 202 to execute or to request another processor to execute the first switching program instructions. Any of a variety of conditions can be detected using these program instructions. As an example, the condition can comprise exceeding a threshold congestion level within a coverage area provided by RAN 104. The coverage area can be defined by the forward-link signals transmitted by the transmitter of RAN 104. The coverage area of RAN 104 can overlap with one or more other RAN so that UE device 102 can handoff from RAN 104 to another RAN as UE device 102 moves farther away from RAN 104 and closer to the other RAN. As another example, the condition can comprise going below a given quality of service (QoS) level established or defined for UE 102 or RAN 104.

As yet another example, the condition can comprise whether the RF conditions within the coverage area provided by RAN 104 are determined to be good RF conditions or poor RF conditions. The poor or good RF conditions can be based on one or more detectable parameters such as the congestion level, the QoS level, transmission latency, or some other parameter.

Furthermore, the detected condition can comprise more than one condition, such as a conditions pertaining to UE device 102 data demand and one or more conditions pertaining to RF performance in the coverage area provided by RAN 104. The conditions pertaining to UE device 102 can, for example, be whether UE device 102 has a high data demand or a low data demand, and whether or not UE device 102 is in a state of actively transmitting data to RAN 104.

As another example, UE device 102 can be configured to report various parameters to RAN 104 so as to notify RAN 104 of RF conditions in the coverage area provided by RAN 104. RAN 104 can determine that the value of parameter(s) provided by UE device 102 do not meet threshold values established for the parameters and use that determination as the detected condition. One such parameter can include a channel quality indicator (CQI) parameter determined by UE device 102. If the CQI does not meet a minimum threshold requirement, UE device 102 may perform an intra-frequency handover to a frequency operating with a better CQI. The detected condition can also be detecting the low CQI parameter sent by UE device 102 and handover of UE device 102 to the other frequency. In accordance with that embodiment, switching operating modes of RAN 104 can lead to improved performance for UE devices continuing to operate in the coverage area provided by RAN 104.

CRPI 210 can comprise program instructions that cause RAN 104 to switch from operating in the mode in which RAN 104 transmits information other than synchronization signals using the particular resources to operating in another mode in which RAN 104 transmits synchronization signals or other non-bearer data using particular radio resources. In this description, these program instructions are referred to as second switching program instructions.

CRPI 210 can comprise program instructions that cause processor 202 to detect occurrence of (for example, detect existence of) a condition that causes processor 202 to execute or to request another processor to execute the second switching program instructions. Any of a variety of conditions can be detected using these program instructions. As an example, the condition can comprise going below the threshold congestion level within a coverage area provided by RAN 104. As another example, the condition can comprise exceeding the given QoS threshold level established or defined for UE 102 or RAN 104. Data storage device 206 can comprise threshold data, such as the threshold congestion level or the QoS threshold level.

CRPI 210 can comprise program instructions that cause processor 202 to generate an indication that RAN 104 switched from operating in the first mode to operating in the second mode. That indication can include an implicit or explicit indication that RAN 104 had been operating in the first mode. As an example, the indication can comprise or be included within a master information block (MIB) transmitted over a broadcast channel of forward-link air interface 112 or a system information block (SIB) transmitted over a control channel of forward-link air interface 112.

CRPI 210 can comprise program instructions that cause processor 202 to provide communication interface 204 with the indication that RAN 104 switched from operating in the first mode to operating in the second mode. Providing that indication to communication interface 204 can automatically cause communication interface 204 to transmit the indication. Alternatively, the indication can include, accompany, proceed or follow an instruction for communication interface 204 to transmit the indication. Transmission of the indication can, for example, occur over a broadcast or control channel that carries data other than bearer data.

CRPI 210 can comprise program instructions that cause processor 202 to generate an indication that RAN 104 switched from operating in the second mode to operating in the first mode. That indication can include an implicit or explicit indication that RAN 104 had been operating in the second mode. As an example, the indication can comprise or be included within a master information block (MIB) transmitted over a broadcast channel of forward-link air interface 112 or a system information block (SIB) transmitted over a control channel of forward-link air interface 112.

CRPI 210 can comprise program instructions that cause processor 202 to provide communication interface 204 with the indication that RAN 104 switched from operating in the second mode to operating in the first mode. Providing that indication to communication interface 204 can automatically cause communication interface 204 to transmit the indication. Alternatively, the indication can include, accompany, proceed or follow an instruction for communication interface 204 to transmit the indication. Transmission of the indication can, for example, occur over a broadcast or control channel that carries data other than bearer data.

CRPI 210 can comprise program instructions that cause processor 202 to reassign resources currently reserved or being used for providing synchronization signals to UE 102. Reassignment of those resources can include reassigning the resources for transmitting bearer data or some data other than synchronization signals.

As another example, CRPI 210 can comprise program instructions that cause RAN 104 to switch from operating in a mode in which RAN 104 transmits non-bearer data, synchronization signals, using particular radio resources to operating in another mode in which RAN 104 transmits bearer data using the particular resources. In this description, these program instructions are referred to as third switching program instructions. The third switching program instructions can be executed in response to detecting the same condition listed above that causes the first switching programs to be executed.

CRPI 210 can comprise program instructions that cause RAN 104 to switch from operating in the mode in which RAN 104 transmits bearer data using particular radio resources to operating in the mode in which RAN 104 transmits non-bearer data, such as synchronization signals, using the particular resources. In this description, these program instructions are referred to as fourth switching program instructions. The fourth switching program instructions can be executed in response to detecting the same condition listed above that causes the second switching programs to be executed.

III. Example Communications

Figure 3:
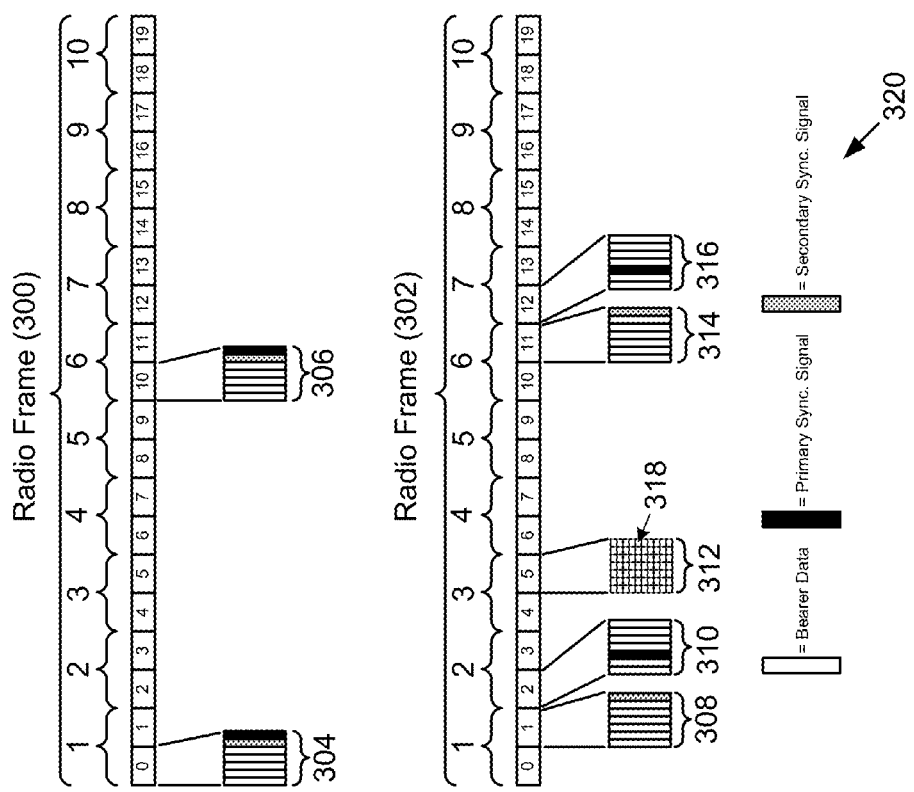
FIG. 3 depicts mapping diagrams for radio frames in accordance with one or more example embodiments.

FIG. 3 depicts a time-domain mapping diagrams for radio frames 300 and 302 in accordance with one or more example embodiments. Radio frames 300 and 302 can be configured as radio frames in accordance with the LTE standard using OFDMA on forward-link air interface 112. Radio frames 300 and 302 each include 20 slots, numbered 0 through 19, inclusively. Radio frames 300 and 302 each include 10 sub-frames, numbered 1 through 10, inclusively. Each sub-frame includes two adjacent slots. Each slot can comprise a defined number of symbols. The slots of radio frames 300 and 302 comprise seven (7) OFDMA symbols. FIG. 3 depicts resource blocks 304 and 306 for slots 0 and 10, respectively, of radio frame 300. FIG. 3 depicts resource blocks 308, 310, 312, 314, and 316 for slots 1, 2, 5, 11, and 12, respectively, of radio frame 302. Other examples of radio frames having a number of slots, sub-frames, or symbols per slot that differ from radio frames 300 and 302 are also possible.

Figure 4:
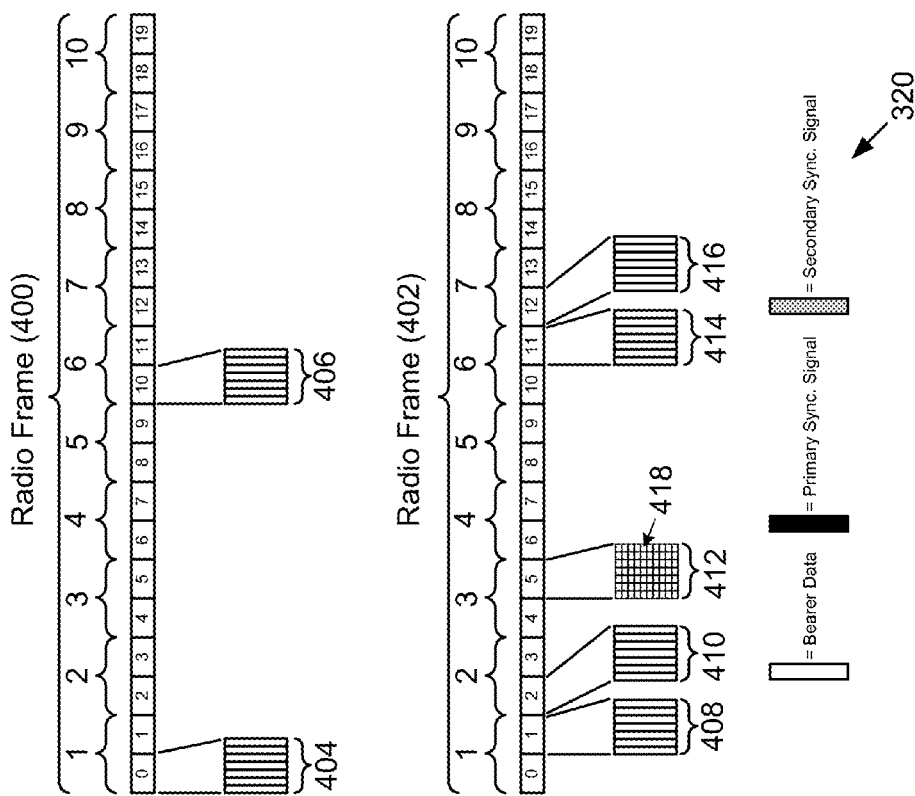
FIG. 4 depicts mapping diagrams for radio frames in accordance with one or more example embodiments.

FIG. 4 depicts a time-domain mapping diagrams for radio frames 400 and 402 in accordance with one or more example embodiments. Radio frames 400 and 402 can be configured as radio frames in accordance with the LTE standard using OFDMA on forward-link air interface 112. Radio frames 400 and 402 each include 20 slots, numbered 0 through 19, inclusively. Radio frames 400 and 402 each include 10 sub-frames, numbered 1 through 10, inclusively. Each sub-frame includes two adjacent slots. Each slot can comprise a defined number of symbols. The slots of radio frames 400 and 402 comprise seven (7) OFDMA symbols. FIG. 4 depicts resource blocks 404 and 406 for slots 0 and 10, respectively, of radio frame 400. FIG. 4 depicts resource blocks 408, 410, 412, 414, and 416 for slots 1, 2, 5, 11, and 12, respectively, of radio frame 402. Other examples of radio frames having a number of slots, sub-frames, or symbols per slot that differ from radio frames 400 and 402 are also possible.

Legend 320, shown in FIG. 3 and FIG. 4, depicts the type of information encoded within the various symbols of radio frames 300, 302, 400, or 404. Legend 320 identifies two different types of synchronization signals used by some UE devices to perform time and frequency synchronization between the UE device and RAN 104 and to obtain a cell identifier of the coverage area provided by RAN 104. The synchronization (sync.) signals include (i) a primary synchronization signal that can include symbol timing information and a cell identifier index, and (ii) a secondary synchronization signal that can include a cell-identifier group index and frame timing information.

Radio frames 300 and 302 are examples of radio frames that RAN 104 may transmit while RAN is operating in the first mode in which RAN 104 transmits synchronization signals using particular radio resources. Various symbols or resource elements within resource blocks 304, 306, 308, 310, 314, and 316 include synchronization signals. Those symbols or resource elements are examples of the particular radio resources used to transmit synchronization signals. Other examples of the particular radio resources are also possible. Radio frames 400 and 402 are examples of radio frames that RAN 104 may transmit while RAN is operating in the second mode in which RAN 104 transmits bearer data using the particular radio resources.

Resource block 312, shown in FIG. 3, and resource block 412, shown in FIG. 4, depict additional details of an example resource block for describing physical resources in each slot of a resource block. In particular, each row within resource block 312 can represent or correspond to one OFDMA sub-carrier, and each column with resource block 312 can represent or correspond to one OFDMA symbol. The smallest time-frequency unit in a resource block 312 or 412 is a resource element, such as resource element 318 or 418, respectively.

RAN 104 can transmit a master information block (MIB) using a broadcast channel, such as a physical broadcast channel (PBCH), of reverse-link air interface 114. The broadcast channel can carry information such as reverse-link system bandwidth, antenna configuration, and reference signal power. RAN 104 can transmit a system information block (SIB) using a control channel, such as a physical downlink control channel (PDCCH), of reverse-link air interface 114. FIG. 7 depicts example parameters 702 and 704 for including within a master information block 700 to provide an indication that RAN 104 is switching from the first mode or the second mode. Parameters 702 and 704 can be encoded within spare data 706 or within another portion of MIB 700.

Parameter 702 indicates whether a resource allocation change has occurred. For example, a value of "yes" assigned to parameter 702 can indicate that RAN 104 has switched or is switching to operate in the first mode in which the radio access node transmits synchronization signals using particular radio resources to switch from operating in the first mode to operating in a second mode in which the radio access node transmits information other than synchronization signals using the particular resources. As another example, a value of "no" assigned to parameter 702 can indicate that RAN has switched or is switching to operate in the second mode in which the radio access node transmits information other than synchronization signals using the particular resources.

Parameter 704 indicates position numbers for resource element allocation that is changing when RAN switches from operating in the first mode to the second mode, or switches from operating in the second mode to the first mode. Those position numbers can identify resource elements within a resource block that will used to transmit bearer data while RAN 104 operates in the second mode, or synchronization signals while RAN 104 operates in the first mode.

MIB 700 or another MIB can be configured to be transmitted with a parameter(s) indicating a MIMO modes UE device 102 can use based on a number of transmit and receive antennas. Those parameters can include, for example, the following parameters: (i) Single Antenna Port Port 0=Mode 1, (ii) Transmit Diversity=Mode 2, (iii) Open Loop Spatial Multiplexing=Mode 3, (iv) Closed Loop Spatial Multiplexing=Mode 4, (v) Multi-user MIMO=Mode 5, (vi) Closed Loop Rank1 with pre-coding=Mode 6, and (vii) Single-Antenna Port: Port5-Beamforming Mode=Mode 7.

IV. Example Operation

Figure 5:
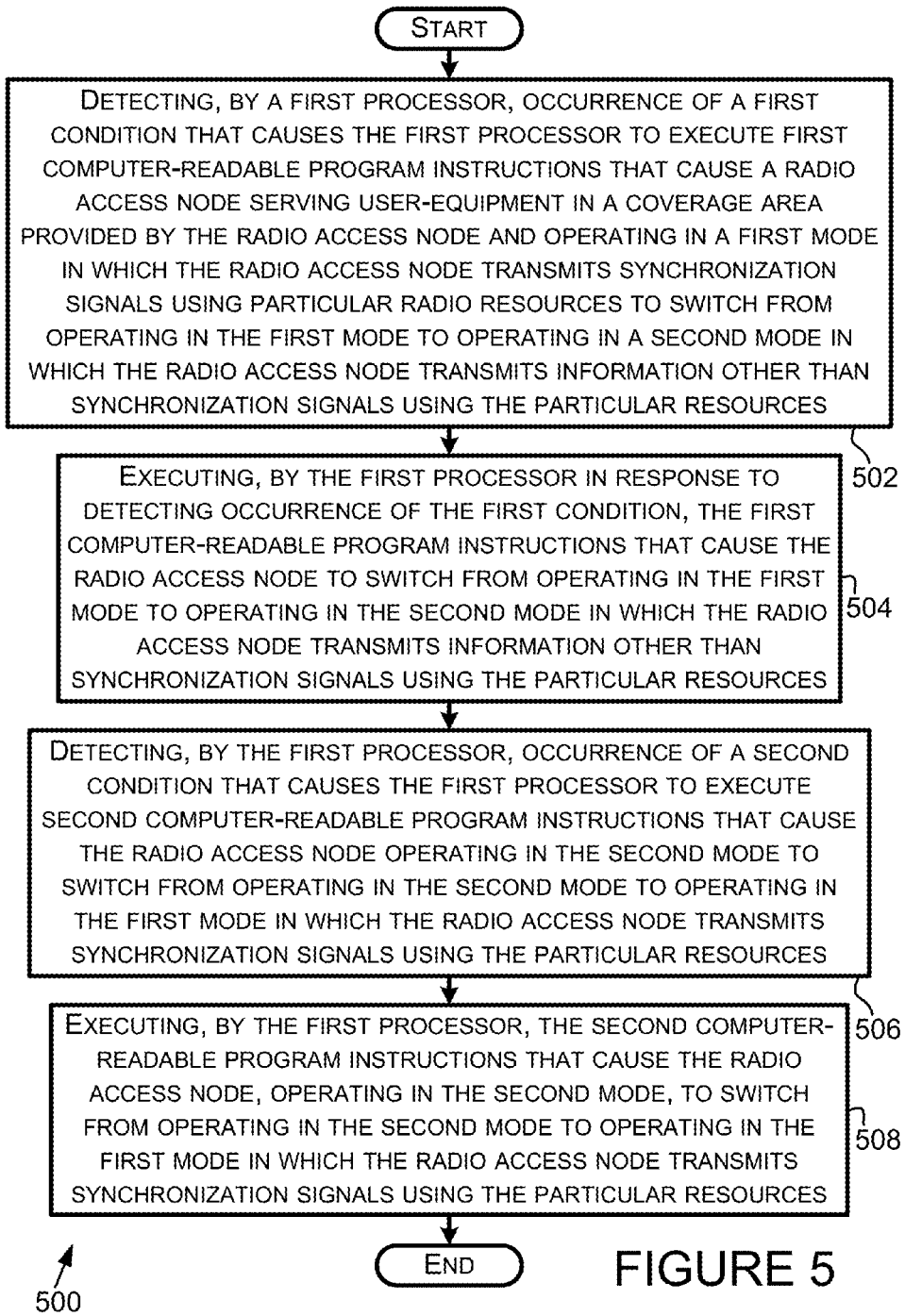
FIG. 5 is a flowchart depicting a set of functions that can be carried out in accordance with one or more example embodiments described herein.

FIG. 5 depicts a flowchart showing a set of functions 500 (or more simply, "the set 500") that can be carried out in accordance with one or more of the example embodiments described herein. The functions of the set 500 are shown within blocks labeled with even numbers between 502 and 508, inclusive. Other functions or operations described herein can be performed prior to, while, or after performing any one or more of the functions of the set 500. Those other functions or operations can be performed in combination with or separately from the any one or more of the functions of the set 500.

Block 502 includes detecting, by a first processor, occurrence of a first condition that causes the first processor to execute first computer readable program instructions that cause a radio access node serving user-equipment in a coverage area provided by the radio access node and operating in a first mode in which the radio access node transmits synchronization signals using particular radio resources to switch from operating in the first mode to operating in a second mode in which the radio access node transmits information other than synchronization signals using the particular resources. The first computer readable program instructions referenced in block 502 can comprise the first switching program instructions or the third switching program instructions discussed above.

The first processor referred to in blocks 502 through 508 can comprise a processor at RAN 104. Since RAN 104 can be configured like network communication device 200, the first processor can be configured like processor 202. The first condition detected by the first processor can comprise any of a variety of detectable conditions under which it is desirable or advantageous to forego transmitting the synchronization signals using the particular resources and to begin transmitting bearer data using the particular resources. In other words, the first condition can comprise any of a variety of detectable conditions under which it is desirable or advantageous to increase throughput for user equipment communicating via RAN 104. Other examples of the first condition are described above.

Next, block 504 includes executing, by the first processor in response to detecting occurrence of the first condition, the first computer-readable program instructions that cause the radio access node to switch from operating in the first mode to operating in the second mode in which the radio access node transmits information other than synchronization signals using the particular resources.

While RAN 104 is switching to operate or operating in the second mode in response to execution of the first computer-readable program instructions referenced in block 504, the first processor can execute third computer-readable program instructions that cause RAN 104 to assign resources, used for transmitting synchronization signals to user-equipment in the coverage area while RAN 104 operated in the first mode, for transmitting bearer data.

RAN 104 can transmit an indication that RAN 104 switched to the second mode in which RAN 104 transmits information other than synchronization signals using the particular resources. That indication can notify UE devices operating within the RAN's coverage area that bearer data will be transmitted using the particular resources. The indication can be contained within a master information block or system information block transmitted by RAN 104.

Next, block 506 includes detecting, by the first processor, occurrence of a second condition that causes the first processor to execute second computer-readable program instructions that cause the radio access node operating in the second mode to switch from operating in the second mode to operating in the first mode in which the radio access node transmits synchronization signals using the particular resources. The second computer readable program instructions referenced in block 506 can comprise the second switching program instructions or the fourth switching program instructions discussed above.

The second condition can comprise any of a variety of detectable conditions under which it is desirable or advantageous to forego transmitting bearer data using the particular resources and to begin transmitting the synchronization signals or other non-bearer data using the particular resources instead of bearer data. As an example, the second condition can comprise a measured congestion level within the RAN's coverage area going below a threshold congestion level defined for the RAN's coverage area. As another example, the condition can comprise exceeding a given QoS level established or defined for UE 102 or RAN 104. As yet another example, the second condition can be operating in the second mode for a threshold amount of time. In that regard, the first processor can start a timer to measure an amount of time RAN 104 has been operating in the second mode since switching from operating in the first mode. That timer can be implemented using CRPI 210.

Next block 508 includes executing, by the first processor, the second computer-readable program instructions that cause the radio node, operating in the second mode, to switch from operating in the second mode to operating in the first mode in which the radio access node transmits synchronization signals using the particular resources.

RAN 104 can transmit an indication that RAN 104 switched back to operating in the first mode in which RAN 104 transmits synchronization signals using the particular resources. That indication can notify UE devices operating within the RAN's coverage area that synchronization signals will be transmitted using the particular resources. The indication can be contained within a master information block or system information block that RAN 104 transmits over a broadcast channel.

After RAN 104, at block 508, switches back to begin or continue operating in the first mode, RAN 104 can repeat the functions of blocks 502, 504, 506, and 508.

Next, FIG. 6 depicts a flowchart showing a set of functions 600 (or more simply, "the set 600") that can be carried out in accordance with one or more of the example embodiments described herein. The functions of the set 600 are shown within blocks labeled with even numbers between 602 and 608, inclusive. Other functions or operations described herein can be performed prior to, while, or after performing any one or more of the functions of the set 600. Those other functions or operations can be performed in combination with or separately from the any one or more of the functions of the set 600.

Block 602 includes detecting, by a first processor, occurrence of a first condition that causes the first processor to request a second processor to execute first computer readable program instructions that cause a radio access node serving at least one user-equipment in a coverage area provided by the radio access node and operating in a first mode in which the radio access node transmits synchronization signals using particular radio resources to switch from operating in the first mode to operating in a second mode in which the radio access node transmits information other than synchronization signals using the particular resources. The first computer readable program instructions referenced in block 602 can comprise the first switching program instructions or the third switching program instructions discussed above.

The first processor referenced in blocks 602 through 608 can comprise a processor at CND 122. Since CND 122 can be configured like network communication device 200, the first processor can be configured like processor 202. The second processor referred to in blocks 602 through 608 can comprise a processor at RAN 104. Since RAN 104 can be configured like network communication device 200, the second processor can be configured like processor 202.

The first condition detected by the first processor can comprise any of a variety of detectable conditions under which it is desirable or advantageous to forego transmitting the synchronization signals using the particular resources and to begin transmitting bearer data using the particular resources. In other words, the first condition can comprise any of a variety of detectable conditions under which it is desirable or advantageous to increase throughput for user equipment communicating via RAN 104. Other examples of the first condition are described above.

The first processor identified in block 602 can comprise processor 202 at CND 122 in accordance with an embodiment in which CND 122 is configured like network communication device 200. The second processor identified in block 602 can comprise processor 202 at RAN 104 in accordance with an embodiment in which RAN 104 is configured like network communication device 200.

Next, block 604 includes requesting the second processor to execute, by the first processor in response to detecting occurrence of the first condition, the first computer-readable program instructions that cause the radio access node to switch from operating in the first mode to operating in the second mode in which the radio access node transmits information other than synchronization signals using the particular resources.

While RAN 104 is switching to operate or operating in the second mode in response to execution of the first computer-readable program instructions referenced in block 604, the first processor at CND 122 can execute third computer-readable program instructions that cause RAN 104 to assign resources, used for transmitting synchronization signals to user-equipment in the coverage area while RAN 104 operated in the first mode, for transmitting bearer data.

RAN 104 can transmit an indication that RAN 104 switched to the second mode in which RAN 104 transmits information other than synchronization signals using the particular resources. That indication can notify UE devices operating within the RAN's coverage area that bearer data will be transmitted using the particular resources. The indication can be contained within a master information block or system information block transmitted by RAN 104.

Next, block 606 includes detecting, by the first processor, occurrence of a second condition that causes the first processor to request the second processor to execute second computer-readable program instructions that cause the radio access node operating in the second mode to switch from operating in the second mode to operating in the first mode in which the radio access node transmits synchronization signals using the particular resources. The second computer readable program instructions referenced in block 606 can comprise the second switching program instructions or the fourth switching program instructions discussed above.

The second condition can comprise any of a variety of detectable conditions under which it is desirable or advantageous to forego transmitting bearer data using the particular resources and to begin transmitting the synchronization signals or other non-bearer data using the particular resources instead of bearer data. As an example, the second condition can comprise a measured congestion level within the RAN's coverage area going below a threshold congestion level defined for the RAN's coverage area. As another example, the condition can comprise exceeding a given QoS level established or defined for UE 102 or RAN 104. As yet another example, the second condition can be operating in the second mode for a threshold amount of time. In that regard, the first processor at CND 122 can start a timer to measure an amount of time RAN 104 has been operating in the second mode since switching from operating in the first mode. That timer can be implemented using CRPI 210.

Next block 608 includes requesting, by the first processor, the second processor to execute the second computer-readable program instructions that cause the radio node, operating in the second mode, to switch from operating in the second mode to operating in the first mode in which the radio access node transmits synchronization signals using the particular resources.

RAN 104 can transmit an indication that RAN 104 switched back to operating in the first mode in which RAN 104 transmits synchronization signals using the particular resources. That indication can notify UE devices operating within the RAN's coverage area that synchronization signals will be transmitted using the particular resources. The indication can be contained within a master information block or system information block that RAN 104 transmits over a broadcast channel.

After RAN 104, at block 608, switches back to begin or continue operating in the first mode, RAN 104 can repeat the functions of blocks 602, 604, 606, and 608.

V. Additional Features

A variety of example devices and computer-readable program instructions have been described to implement the example embodiments. Those devices or computer-readable program instructions can be configured to carry the following features.

1. If, and while, UE device 102 is determined to have a high data demand and the RF conditions provided by RAN 104 are determined to be good, then transmission of synchronization signals to the UE devices can be reduced or stopped completely, and transmission of control signals to the UE devices in a state of active data transmission can be reduced. Furthermore, given a synchronization between a commercial mobile alert system (CMAS) and RAN 104, RAN 104 can determine whether to reduce or stop transmission of critical broadcast system information.

2. If, and while, UE device 102 is determined to have a low data demand and the RF conditions provided by RAN 104 are determined to be good, then the amount or occurrence of synchronization signals to UE device 102 can be reduced. Control signaling and critical broadcast information can remain at normal levels.

3. If, and while, UE device 102 is determined to have a high data demand and the RF conditions provided by RAN 104 are determined to be poor, then the control signaling to UE devices in the state of active data transmission can be reduced, and additional resource elements can be allocated for transmission of synchronization signals to the UE devices. Furthermore, given a synchronization between a commercial mobile alert system (CMAS) and RAN 104, RAN 104 can determine whether to reduce or stop transmission of critical broadcast system information.

4. If, and while, UE device 102 is determined to have a low data demand and the RF conditions provided by RAN 104 are determined to be poor, then additional resource elements can be allocated for transmission of synchronization signals to the UE devices.

A person having ordinary skill in the art will understand that different levels of data demand can be defined as a high data demand or a low data demand, and various parameters and levels for those parameters can be used to define whether RF conditions provided by RAN 104 are good or poor RF conditions.

VI. Conclusion

Example embodiments have been described above. Those skilled in the art will understand that changes and modifications can be made to the described embodiments without departing from the true scope and spirit of the present invention, which is defined by the claims.

We claim:

1. A method comprising:
  determining, by a radio access node, a user-equipment device is operating under a first set of conditions;
  transmitting, by the radio access node to the user-equipment device while the user-equipment device is operating under the first set of conditions, a set of synchronization signals over particular radio resources, wherein the particular radio resources are used exclusively for transmitting synchronization signals while the user-equipment device is operating under the first set of conditions;
  determining, by the radio access node, the user-equipment device is operating under a second set of conditions instead of the first set of conditions;
  transmitting, by the radio access node to the user-equipment device, an indication that the radio access node switched to a mode in which the radio access node transmits bearer data and a reduced set of synchronization signals over the particular radio resources; and
  transmitting, by the radio access node to the user-equipment device while the user-equipment device is operating under the second set of conditions, bearer data and a reduced set of synchronization symbols over the particular radio resources.

2. The method of claim 1, wherein the radio access node comprises an eNodeB.

3. The method of claim 1, wherein the first set of conditions includes a condition comprising exceeding a threshold congestion level within a coverage area provided by the radio access node.

4. The method of claim 1, wherein the indication comprises a master information block transmitted on a broadcast channel of the radio access node.

5. The method of claim 1, wherein the particular radio resources comprise resource elements within a resource block assigned to the user-equipment device.

6. The method of claim 1, wherein the second set of conditions includes the user-equipment device operating with a high data demand and good radio frequency conditions.

7. The method of claim 6, wherein the first set of conditions is selected from the group consisting of (i) the user-equipment device operating with a high data demand and poor radio frequency conditions, (ii) the user-equipment device operating with a low data demand and good radio frequency conditions, and (iii) the user-equipment device operating with a low data demand and poor radio frequency conditions.

8. The method of claim 7, further comprising:
determining, by the radio access node, the user-equipment device is operating under the first set of conditions instead of the second set of conditions; and
transmitting, by the radio access node to the user-equipment device after determining the user-equipment device is operating under the first set of conditions, a non-reduced set of synchronization symbols without any bearer data over the particular radio resources.

9. The method of claim 1, wherein the reduced set of synchronization signals comprises zero synchronization signals.

10. The method of claim 1, further comprising:
determining, by the radio access node, whether to reduce or stop transmission of critical broadcast system information based on a synchronization between the radio access node and a commercial mobile alert system.

11. The method of claim 1, wherein the set of synchronization signals transmitted while the user-equipment device is operating under the first set of conditions include a primary synchronization signal that includes symbol timing information and a cell identifier index, and a second synchronization signal that includes a cell-identifier group index and frame timing information.

12. A radio access node comprising:
a processor;
a data storage device comprising computer-readable program instructions executable by the processor; and
a radio transmitter configured to transmit bearer data and synchronization signals to a user-equipment device over particular radio resources in a coverage area provided by the radio access node,
wherein the computer-readable program instructions comprise first program instructions executable by the processor to determine the user-equipment device is operating under a first set of conditions,
wherein the radio transmitter uses the particular radio resources exclusively for the transmission of synchronization signals while the user-equipment device is operating under the first set of conditions,
wherein the computer-readable program instructions comprise second program instructions executable by the processor to determine the user-equipment device is operating under a second set of conditions,
wherein the radio transmitter is configured to transmit a first indication that the radio transmitter has switched to a mode in which the radio transmitter transmits bearer data and a reduced set of synchronization signals using the particular radio resources, and
wherein the radio transmitter uses the particular radio resources to transmit bearer data and a reduced set of synchronization signals to the user-equipment device while the user-equipment device is operating under the second set of conditions.

13. The radio access node of claim 12, wherein the radio transmitter is configured to transmit a second indication that the radio transmitter has switched to a mode in which the radio transmitter uses the particular radio resources exclusively for the transmission of synchronization signals.

14. The radio access node of claim 13,
wherein the first indication includes a first broadcast message arranged as a master information block, and
wherein the second indication includes a second broadcast message arranged as another master information block.

15. The radio access node of claim 12, wherein the processor, the data storage device, and the radio transmitter are part of an enhanced NodeB radio access node.

16. The radio access node of claim 12, wherein the second set of conditions includes the user-equipment device operating with a high data demand and good radio frequency conditions.

17. The radio access of node claim 16, wherein the first set of conditions is selected from the group consisting of (i) the user-equipment device operating with a high data demand and poor radio frequency conditions, (ii) the user-equipment device operating with a low data demand and good radio frequency conditions, and (iii) the user-equipment device operating with a low data demand and poor radio frequency conditions.

18. The radio access of node of claim 12, wherein the reduced set of synchronization signals comprises zero synchronization signals.

19. A non-transitory computer-readable data storage device comprising program instructions executable by a processor to cause performance of the following operations:
determining, by a radio access node, a user-equipment device is operating under a first set of conditions;
transmitting, by the radio access node to the user-equipment device while the user-equipment device is operating under the first set of conditions, a set of synchronization signals over particular radio resources, wherein the particular radio resources are used exclusively for transmitting synchronization signals while the user-equipment device is operating under the first set of conditions;
determining, by the radio access node, the user-equipment device is operating under a second set of conditions instead of the first set of conditions;
transmitting, by the radio access node to the user-equipment device, an indication that the radio access node switched to a mode in which the radio access node transmits bearer data and a reduced set of synchronization signals over the particular radio resources; and
transmitting, by the radio access node to the user-equipment device while the user-equipment device is operating under the second set of conditions, bearer data and a reduced set of synchronization symbols over the particular radio resources.

20. The non-transitory computer-readable data storage device of claim 19, wherein the particular radio resources comprise resource elements within a resource block assigned to the user-equipment device.

* * * * *